March 12, 1963  A. J. SMIHAL  3,080,581

LIGHT FIXTURE FOR TOWED OUTBOARD MOTOR BOATS
Filed March 22, 1961

INVENTOR
Anthony J. Smihal

BY Lawrence J. Field
William Grobman

ATTORNEYS

3,080,581
LIGHT FIXTURE FOR TOWED OUTBOARD
MOTOR BOATS
Anthony J. Smihal, 4115 W. 215th St.,
Fairview Park, Ohio
Filed Mar. 22, 1961, Ser. No. 97,547
3 Claims. (Cl. 9—1)

This invention relates to an electric light fixture which can be mounted directly around the shaft of an outboard motor boat for use while the motor boat is being towed on land.

Motor boating enthusiasts do much of their travelling to and from bodies of water at night in order to utilize to the fullest extent the weekend or vacation time at their disposal. In the usual practice, the motor boat hull is mounted on a trailer and if it is an outboard, the outboard motor is clamped to the stern of the boat and tilted up to clear ground level obstacles such as boulders while it is being towed on the trailer.

For travel at night, the law requires and it is obviously necessary to provide some sort of warning signal on the trailer or boat in order to avoid collisions such as would occur when the boat and trailer are overtaken by a vehicle moving in the same direction. Such warning devices as reflectors or lights attached to the deck or to the stern of the boat or permanently mounted on the trailer frame are frequently covered over by the canvas or tarpaulin used to protect the boat from the elements during travel, or they fall off or are broken or otherwise rendered inoperative. Unless the warning signal is attached to the rearmost portion of the towed structure the danger of collision in periods of poor visibility is very real.

One object of the present invention is to provide an improved warning signal for outboard motorboats being towed on a trailer at night or during periods of poor visibility.

A specific object of the invention is to provide a fixture adapted to be positioned at the extreme rearmost portion on the boat being towed.

More particularly, it is an object of this invention to provide an improved detachable mounting for electric warning lights which can be mounted directly on the shaft of the outboard motor.

Still another object is to provide a detachable mounting which may be economically fabricated into a permanent and durable fixture.

Still a further object of the invention is to provide a fixture which may be readily plugged in to receive power from the trailer.

These and further objects will be made apparent in the description which follows and from the accompanying drawings, in which FIGURE 1 is a fragmentary view partly in perspective showing the outboard equipped with the warning signal light fixture and lights of this invention;

Figure 1:
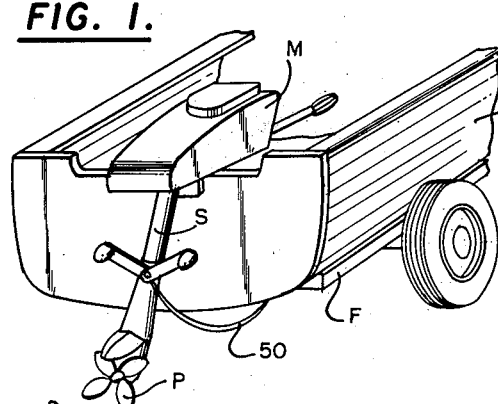
Figure 2:
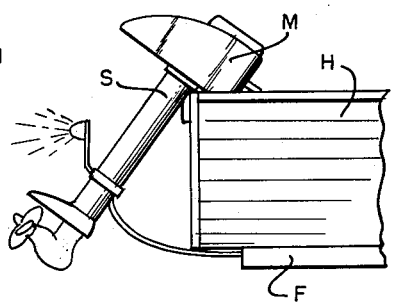
FIGURE 2 is a side elevation of a portion of the device of FIGURE 1.

In FIGURE 1 there is shown a fragment of a trailer rig having a frame F on which there is supported a motorboat hull H, which in turn supports an outboard motor M in an upright position with the propeller P at the foot of the outboard motor shaft S and the conventional bracket (frame) at the upper part of the motor, for securely and tiltingly attaching the same to the stern of the boat hull. All of the above are selected from old and well known devices available commercially and form no part of the present invention.

The warning signal lights and support for the lights which constitute the present invention comprise a main mounting strap 10 formed of any suitable material such as an annealed spring steel strip, a pair of perforated bracket arms 14 bolted to the main mounting strap and a pair of lights 16 each of which is permanently fastened to one of the bracket arms, plus the wiring necessary to connect the lights to a source of electrical energy.

The main mounting strap 10 may be constructed of any structural material having the desired combination of rigidity, strength, durability and fabricability. One suitable material, preferred by me, is strip of annealed spring steel, at least about ¾ inch in width and of a thickness which affords ease in fabrication, but is sufficient to rigidly support the light carrying bracket. Strip between about 0.025 and 0.050 inch in thickness is quite satisfactory.

To fabricate strap 10 a suitable length of annealed spring steel is cut from a roll of annealed strip. Then a hole 12 is pierced in the center of the main mounting strap, equally distant from the ends of the strap. Thereafter the strap is bent into the shape shown in FIGURE 4. First a 1½ inch radius is formed on either side of the pierced hole and a reverse ⅜ inch radius is formed on each end of the 1½ inch radius. This is followed by a short straight section and then by an 8½ inch radius formed on each end of the strap in reverse direction of the ⅜ inch radius. One free end 20 of the strap 10 is given a rolled curl 22 to form a hole through which one leg 30 of a wire loop clasp 24 is passed. The other free end 26 of the strap is given a partially rolled curl to form a hook 28 to receive the opposite leg 32 of the wire loop clasp 24 and hold the device secure.

Figure 4:
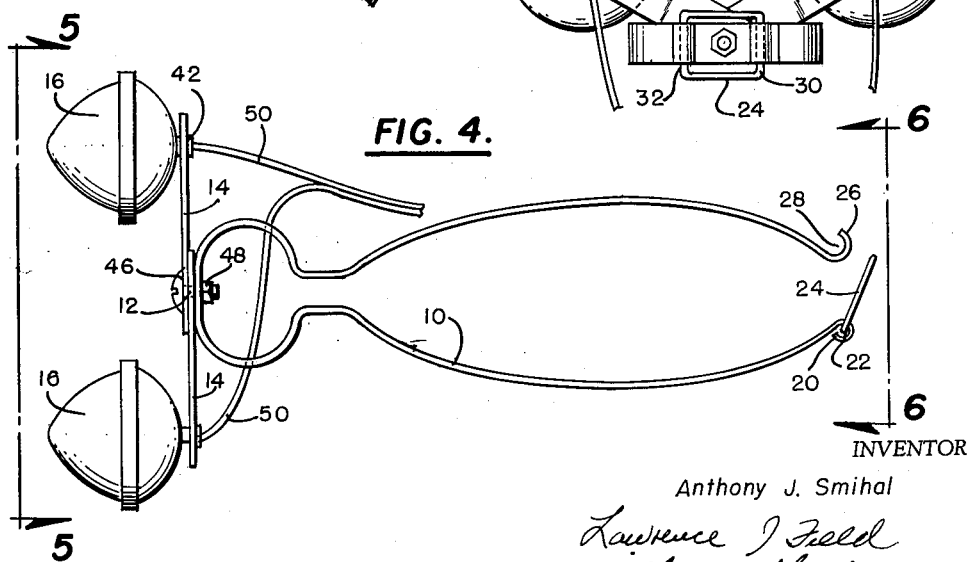
FIGURE 4 is a plan view of the fixture prior to attachment to the shaft of the outboard motor.

After shaping the main mounting strap into the shape shown in FIGURE 4, the piece is heat treated to produce a spring steel quality of about 46 Rockwell scale C.

Figure 3:
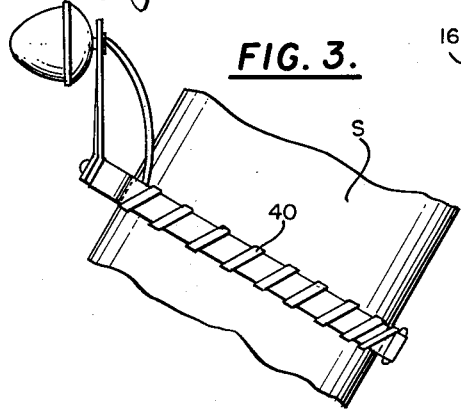
FIGURE 3 is an enlarged view showing in greater detail a portion of the structure shown in FIGURE 2.
Figure 5:
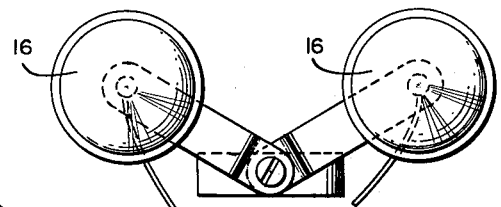
FIGURE 5 is an end view of the fixture of FIGURE 4 looking in the direction 5—5 and FIGURE 6 is a view of the fixture of FIGURE 4 seen from the opposite end, when the clamping fixture has been closed by a clasp.
Figure 6:
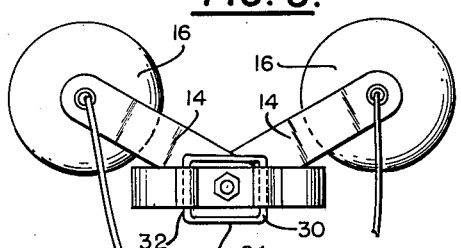

On each of the 8½ inch radius curved portions, a piece of plastic 40 or foamed synthetic polymer material is cemented, or wound around the strap as shown in FIGURE 3. This gives a gripping action when the device is mounted on the motor shaft, reduces slipping to a minimum and eliminates a metal to metal contact. The main mounting strap can be made in varying lengths to accommodate several diameters of motor shaft housings.

After the main mounting strap has been fabricated in the manner described, each of the two lights is permanently fastened to a perforated steel bracket arm 14 of a suitable length, e.g. 3–5 inches. The shell of the light is projected through a hole 42 provided adjacent one end of the bracket arm and is rolled over clenching the light shell to the bracket arm. The light receiving fixture is mounted within the shell and the light wire 50 comes through the assembly.

After each light has been secured to its own bracket arm, the two bracket arms are joined to the main mounting strap by bolting the bracket arm to the main mounting strap at its mid point, by means of a bolt 46 and nut 48.

By using a two filament bulb, socket and four-way plug, and by running leads from the plug socket into the tail light wires and in parallel therewith, lights 16 can be made to function as both tail light and stop light.

It will be seen that the fixture shown in FIGURE 4 permits the light to be displayed at the rearmost portion of the towed boat, and thereby diminishes the possibility of overtaking and colliding with the trailer and boat thereon, particularly in periods of low visibility.

Having now described my invention in accordance with the patent statutes, I claim:

1. In combination, a self propelled towing vehicle, a wheeled trailer operatively connected to said vehicle to be towed, an outboard motor boat supported on said trailer and an outboard motor mounted on the stern of said boat, a detachable strap member encircling the shaft of said outboard motor, said strap having an open, forwardly facing portion terminating in two free ends; a wire clasp permanently secured to one of the free ends of said strap and detachably secured to the other of said free ends to detachably close the opening between said free ends; a bolt passing through said strap midway between said free ends; a bracket attached by said bolt to the rearwardly facing portion of said strap; said bracket comprising a pair of arms each having one end secured by said bolt and an opposite end; a rearwardly facing light attached to the opposite end of each of said bracket arms and means electrically connecting said lights to a source of electrical energy.

2. A light fixture comprising a one-piece strap adapted to encircle the shaft of an outboard motor being towed; said strap being formed with a relatively short straight middle portion; a generally semicircular section extending from each of the ends of said straight portion, and terminating in a reverse bend merging into a short straight section generally perpendicular to the middle portion, said short sections constituting a narrow waist in said strap; and a relatively long oval-shaped open portion terminating in two free ends; a closed loop in one of said ends; an open loop in the other of said ends; a wire clasp secured in said closed loop and adapted to be engaged by said open loop, to hold the free ends of said strap in a closed position encircling an outboard motor boat shaft; a bracket attached to said strap intermediate of said free ends; and at least one light supported by said bracket.

3. The combination of claim 2 wherein the strap is provided with a friction material on at least that portion of the strap which physically contacts the outboard shaft.

References Cited in the file of this patent
UNITED STATES PATENTS

| | | |
|---|---|---|
| 1,058,576 | Frantz | Apr. 8, 1913 |
| 1,925,593 | Long | Sept. 5, 1933 |
| 2,074,643 | Domenego | Mar. 23, 1937 |
| 2,518,602 | Crook | Aug. 15, 1950 |

FOREIGN PATENTS

| | | |
|---|---|---|
| 731,547 | Germany | Feb. 11, 1943 |